United States Patent [19]

Bugg

[11] Patent Number: 4,783,189

[45] Date of Patent: Nov. 8, 1988

[54] CONNECTORS FOR ASSEMBLING STRUCTURAL MEMBERS

[76] Inventor: Stuart E. Bugg, P.O. Box 652, Winchester, Va. 22601

[21] Appl. No.: 51,854

[22] Filed: May 20, 1987

[51] Int. Cl.⁴ .......................... B25G 3/00; F16B 9/00
[52] U.S. Cl. ................................. 403/264; 403/407.1
[58] Field of Search ................. 403/407.1, 264, 252; 5/298

[56] References Cited

U.S. PATENT DOCUMENTS

| | | | |
|---|---|---|---|
| 167,118 | 8/1875 | Pritchett | 5/298 X |
| 4,518,278 | 5/1985 | Koch | 403/407.1 X |

*Primary Examiner*—Andrew V. Kundrat
*Attorney, Agent, or Firm*—John B. Dickman, III

[57] ABSTRACT

A mechanical connector for structural members including a threaded rod with double ends and a pair of similar nuts and cam sockets to tighten the connector. A pair of aligned bore holes and circular holes in the structural members receive the threaded rod and nuts and cam sockets to secure the structural members.

5 Claims, 2 Drawing Sheets

CONNECTORS FOR ASSEMBLING STRUCTURAL MEMBERS

BACKGROUND OF THE INVENTION

The field of the invention is connectors for assembling two members without the use of nails or screws.

Assembling members with mechanical connectors are well known, however, for the most part the prior art is either too complicated to use or not strong enough to hold large members such as building structures together. There are connectors for furniture and panels, but the prior art is devoid of mechanical fasteners to hold together building structures. It is this area of connectors which the present invention finds its principle application.

In the building filed many structures are joined in a T-shape or some other angle. There are also situations where a connection is used for joining corners and anchoring structures in place. The prior art connectors will not fill all the needs, whereas the present invention is universally adaptable to any of these situations.

The following prior art U.S. patents are known to the inventor:
 U.S. Pat. No. 2,581,816, SCHLUETER;
 U.S. Pat. No. 4,145,862, SYGNATOR;
 U.S. Pat. No. 4,202,645, GIOVANNETTI;
 U.S. Pat. No. 4,292,003, POND;
 U.S. Pat. No. 4,325,649, ROCK;
 U.S. Pat. No. 4,549,831, LAUTENSCHLAGER;

A review of these patents shows that some of the patents relate to joining panels at right angles. The mechanical connectors for joining the panels take up space at the corner connection which may interfere with the structure. The patents to Pond, U.S. Pat. No. 4,292,003; Rock, U.S. Pat. No. 4,325,649, and Lautenschlager, U.S. Pat. No. 4,549,831 show mechanical connectors for right angle or corner connections.

A bolt connector is shown in Schlueter, U.S. Pat. No. 2,581,816. The mechanical connector uses a cam for drawing the two members together. An Allen wrench rotates the cam into a locking position.

The patent to Giovannette, U.S. Pat. No. 4,202,645, shows joining panels where one panel has a circular opening intersected by a bored hole. The other panel has a headed shank, which projects into the bored hole of the first panel. A cam having been inserted in the circular opening engages the shank, and when rotated locks the two panels together.

The invention relates to a mechanical connector for joining together structual members having universal applications.

In general, the mechanical connector is double ended, that is, what one end has as parts, so does the other. Also, the structual members to be joined have circular openings and intersecting bore holes. A threaded rod is cut to fit into the bore holes of the structural members and extended into the circular openings. A pair of nuts are threaded on either end of the rod. The most important part of the mechanical connector is a cam socket which has an L-shaped slot cut in it and a cam cross-section, where the slot allows the cam socket to slip on the threaded rod and rotate to tighten the fastener.

To start the nut on the threaded rod a special tool with a threaded end is used. The nut is first threaded on to the tool and then inserted into the circular opening to align the nut with the threaded end. The nut is rotated from the tool to the threaded rod. Without the tool putting the nut on the rod is very difficult.

It is an object of the invention to provide a mechanical connector for joining structual members.

Another object of the invention is to provide a mechanical connector that is contained within the joined structural members without protruding beyond the members.

Still another object is to provide a mechanical connector which can be used with large or small structures.

Yet another object is to provide a mechanical connector that is inexpensive to manufacture.

DESCRIPTION OF THE DRAWINGS

Figure 1:
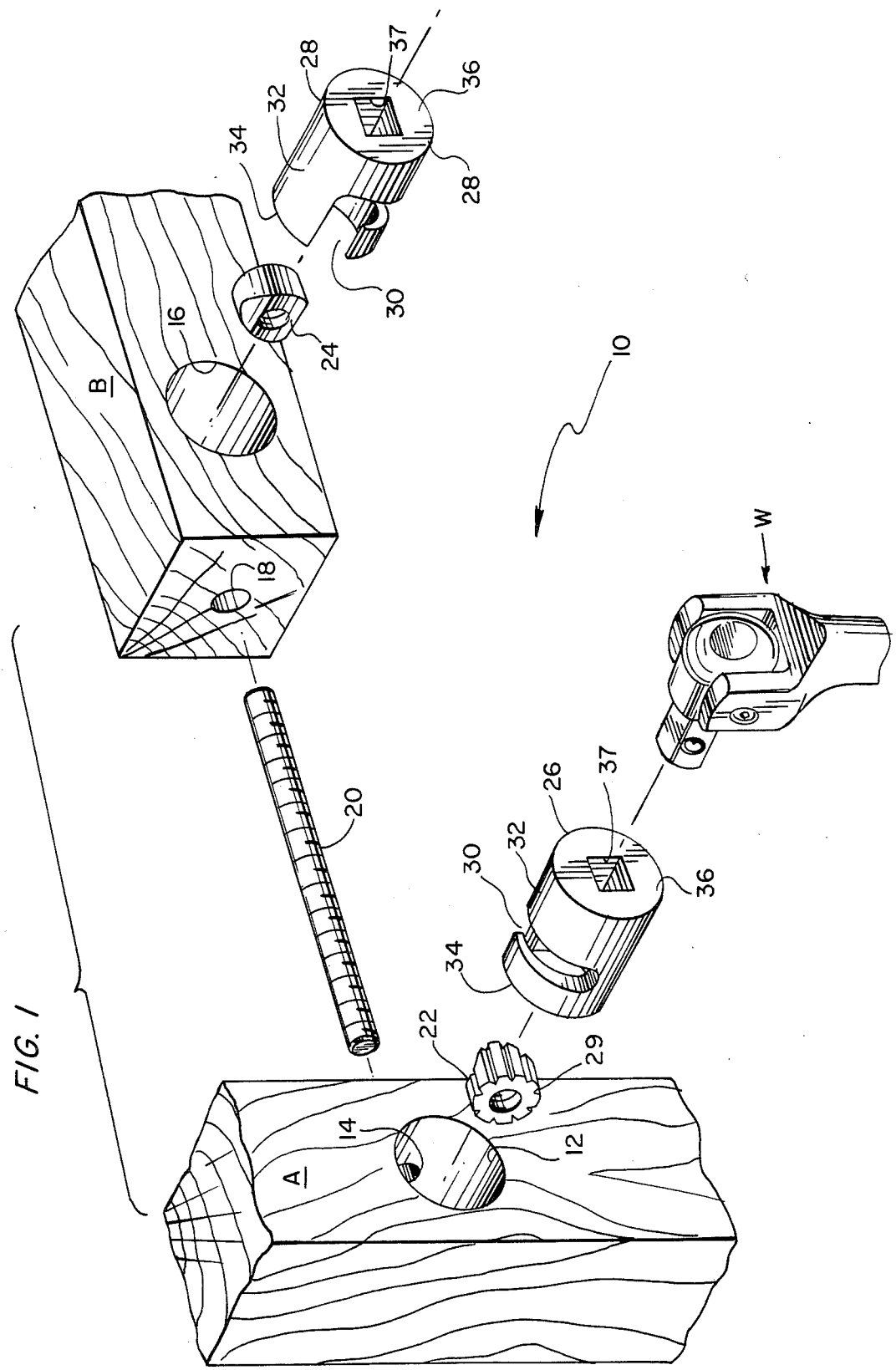
FIG. 1 is an isometric view of a mechanical connector of the invention showing joining two structual members together.

Referring to the drawings, there is shown in FIG. 1 structual members A and B to be joined together by a mechanical fastener 10. Structual member A is vertical and has a circular hole 12 and a bore hole 14 that innersects circualr hole 12. Structual member B, on the other hand, is horizontal with a circular hole 16 and a bore hole 18. When the bore holes 14 and 18 are aligned there is a continuous bore hole between the circular holes 12 and 16.

Figure 4:
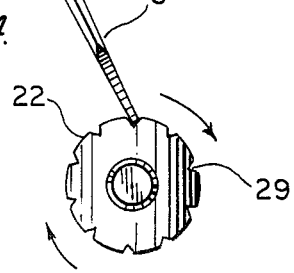
FIG. 4 is an end view of a nut of the invention.

Mechanical fastener 10 consists of several parts, with threaded rod 20, a pair of like nuts 22 and 24, and cam sockets 26 and 28. The nuts 22 and 24 and cam sockets 26 and 28 are duplicate of one another. Nuts 22 and 24 have notches 29, best shown in FIG. 4 and an arcuate surface 31 which will be explained.

To assemble the structural members A and B with mechanical fastener 10, the threaded rod 20 is inserted into either bore hole 14 or 18 and either nut 22 or 24 is threaded on it. The free end of the threaded rod 20 is inserted in the other of the bore holes 14 or 18 and the other nut 22 or 24 is threaded on it. Cam socket 26 or 28 is inserted in either circular hole 12 or 14 to tighten the connector 10. The other cam socket is inserted in the other circular hole and tightened which tightly joins the structual members A and B together.

Figure 5:
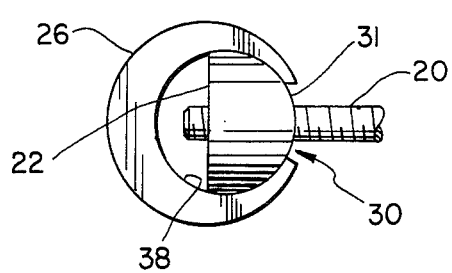
FIG. 5 is a side view of a cam socket and nut of the invention before the cam socket is rotated.
Figure 6:
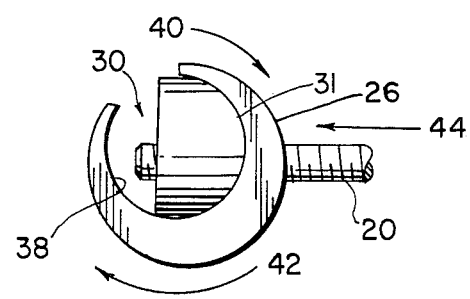
FIG. 6 is a side view of the cam socket of FIG. 5 after it has been rotated.

The cam sockets 26 and 28 are similar, having a cylindrical shaped body 32, opened at one end 34 and closed at the other 36. End 36 has a square hole 37 for receiving a socket wrench. An L-shaped slot 30, beginning at the edge of open end 34 and extending around the cylindrical body 32 slips on the threaded rod 20 when tightening the connector 20. Starting at the L-shaped slot 30 is a cam surface 38 which increases in thickness, as shown in FIGS. 5 and 6. The arcuate surface 31 of either nut 22 and 24 fits against the inside cam surface 38 of the cam socket 26 or 28, therefore as the cam surface 38 is rotated it in the direction of arrow 40, a force is applied to nut 22 or 24 tightening the connector. To turn the cam socket, a socket wrench W is inserted in square hole 37 and turned in the direction of arrows 40 and 42. The applied force is in the direction of arrow 44. To loosen the connector 10, the wrench W is turned in the opposite direction.

Applying the nuts 26 and 28 to the threaded rod 20 is accomplished with a special tool 46, which has a shaft 48 with a threaded element 50 at one end. One of the nuts is threaded on element 50 and inserted into one of the circular holes. The tool 46 aligns the nut with the threaded rod 20 so that the screwdriver or other suitable tool can rotate the nut on the threaded rod.

Figure 2:
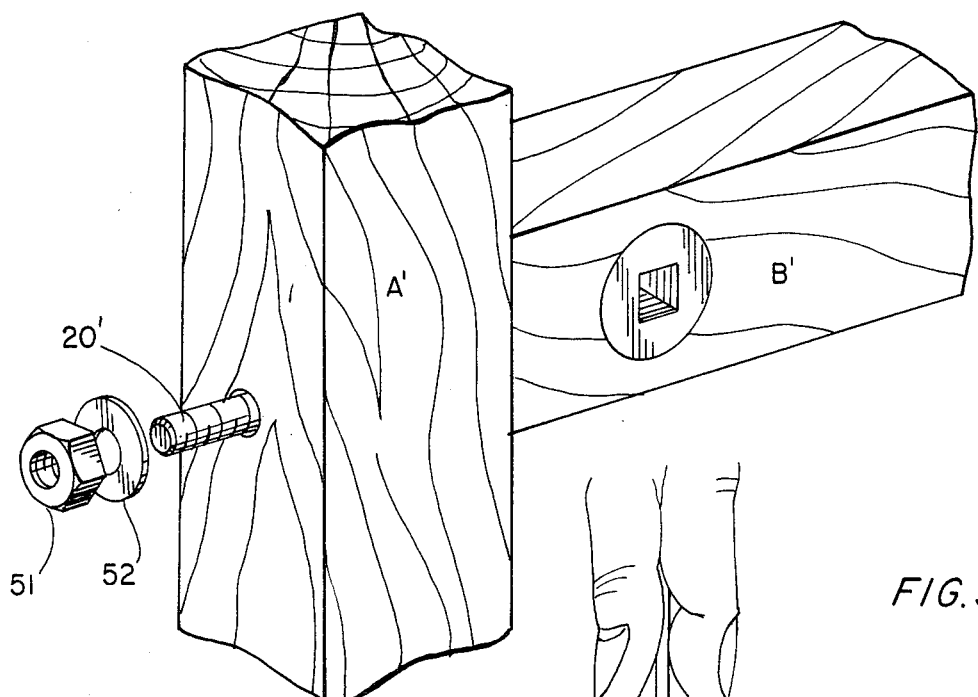
FIG. 2 is a perspective view of structual members joined by a mechanical connector of the invention.
Figure 3:
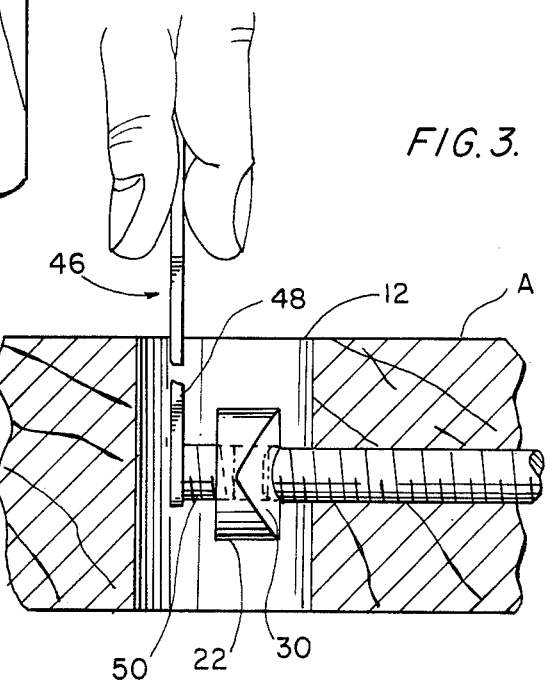
FIG. 3 is a cross section of a structual member showing applying a nut to a threaded rod of a mechanical connector of the invention.

FIG. 2 is another embodiment of the invention where the structual members A' and B' are vertical and horizontal, respectively. The difference being that member A' has a through bore hole and a threaded rod 20' extends through the bore hole to receive a washer 51 and nut 52. With nut 52 threaded tightly on the rod 20; the cam socket 28 is turn by a wrench to secure the members together.

It should be understood that while two embodiments of the invention have been shown, other embodiment may become apparent to those skilled in the art. Therefore, for a more complete understanding of the invention one should study the drawings and specification in view of the claims.

I claim:

1. A mechanical connector for fastening two members together where the members have aligning bore holes and circular holes, the mechanical connector comprising:

a threaded rod element of a length to extend through said bore holes a distance into said circular holes.

a pair of nut means threaded onto the ends of said threaded rod elements, said nut means placed on said threaded rod element in said circular holes, and a pair of cam sockets having similar shapes including a cylindrical body, an open end and a closed end, an L-shaped slot extending from said open end along said cylindrical body to fit on said threaded rod element, a cam surface means starting at said L-shaped slot and increasing in thickness on the cross section of said cylindrical body to a point at or near the opposite side of said cylindrical body from said L-shaped slot to apply increased pressure on said pair of nut means to tightly join the members together.

2. A mechanical connector as in claim 1 wherein said pair of nut means have notches around the outside surface for receiving a tool for threading said nuts onto said threaded rod means.

3. A mechanical connector as in claim 2 wherein said pair of nut means having arcuate surfaces to conform to the cam surface means of said cam sockets.

4. A mechanical connector as in claim 3 wherein said cam sockets closed ends have a socket wrench receiving means for turning said cam sockets.

5. A mechanical connector as in claim 4 wherein said pair of nut means is aligned with said threaded rod means using a tool having a shaft and a threaded end for threadedly supporting said nut means as it is being threaded on said threaded rod means.

* * * * *